US012648023B2

(12) United States Patent
Zhang

(10) Patent No.: US 12,648,023 B2
(45) Date of Patent: Jun. 2, 2026

(54) METHOD FOR DETERMINING TRANSMISSION RECEPTION POINT, NETWORK DEVICE, AND STORAGE MEDIUM

(71) Applicant: SPREADTRUM COMMUNICATIONS (SHANGHAI) CO., LTD., Shanghai (CN)

(72) Inventor: Meng Zhang, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 565 days.

(21) Appl. No.: 18/028,366

(22) PCT Filed: Sep. 23, 2021

(86) PCT No.: PCT/CN2021/119899
§ 371 (c)(1),
(2) Date: Oct. 16, 2023

(87) PCT Pub. No.: WO2022/063173
PCT Pub. Date: Mar. 31, 2022

(65) Prior Publication Data
US 2024/0057168 A1      Feb. 15, 2024

(30) Foreign Application Priority Data
Sep. 25, 2020    (CN) .......................... 202011029829.6

(51) Int. Cl.
*H04W 74/0833* (2024.01)
*H04W 72/044* (2023.01)
(52) U.S. Cl.
CPC ..... *H04W 74/0833* (2013.01); *H04W 72/044* (2013.01)

(58) Field of Classification Search
CPC ........................ H04W 74/0833; H04W 72/044
See application file for complete search history.

(56) References Cited

U.S. PATENT DOCUMENTS

2019/0052343 A1    2/2019  Li et al.
2021/0105827 A1*   4/2021  Tsai ..................... H04W 76/28
2021/0282168 A1*   9/2021  Matsumura ....... H04W 72/1273
2023/0143378 A1*   5/2023  Li ..................... H04B 7/06964
                                                            370/242

FOREIGN PATENT DOCUMENTS

CN          110859003  A      3/2020
CN          110896546  A      3/2020
                (Continued)

OTHER PUBLICATIONS

Nokia et al. Enhancements on Beam Management for Multi-TRP/Panel Transmission, 3GPP TSG RAN WG1 #103-e Meeting, R1-2008906, Nov. 1, 2020.

(Continued)

*Primary Examiner* — Natasha W Cosme
(74) *Attorney, Agent, or Firm* — HAUPTMAN HAM, LLP

(57) ABSTRACT

A method for determining a transmission reception point (TRP), a network device, and a storage medium are provided. The method includes the following. A network device receives a first message from a terminal device, where the first message indicates that beam failure occurs in the terminal device and/or indicates information of a candidate beam; and determines a first TRP based on the first message, where the first TRP is a TRP in which the beam failure occurs among N TRPs.

9 Claims, 4 Drawing Sheets

(56) References Cited

FOREIGN PATENT DOCUMENTS

| CN | 111278122 A | 6/2020 |
| CN | 111543024 A | 8/2020 |
| CN | 111567081 A | 8/2020 |
| CN | 112119597 A | 12/2020 |
| EP | 3823176 A1 | 5/2021 |
| EP | 4135472 A1 | 2/2023 |
| WO | 2020012619 A1 | 1/2020 |
| WO | 2020143049 A1 | 7/2020 |

OTHER PUBLICATIONS

WIPO, International Search Report and Written Opinion for International Application No. PCT/CN2021/119899, Dec. 22, 2021.

ZTE: "Considerations on beam management for multi-TRP", 3GPP Draft; R1-1904021, Mar. 30, 2019.

ZTE: "Enhancements on beam management for multi-TRP", 3GPP Draft; R1-2005457, Aug. 8, 2020.

Spreadtrum Communications: "Discussion on multi-beam operation", 3GPP Draft; R1-1904781, Apr. 7, 2019.

Lenovo et al: "Discussion of multi-beam operation", 3GPP Draft; R1-1812785, Nov. 2, 2018.

The extended European search report issued in corresponding EP application No. 21871542.3 dated Feb. 26, 2024.

The first office action issued in corresponding CN application No. 202011029829.6 dated Mar. 8, 2024.

The second office action issued in corresponding CN application No. 202011029829.6 dated Aug. 1, 2024.

Notification to grant patent right for invention issued in corresponding CN application No. 202011029829.6 dated Dec. 17, 2024.

* cited by examiner

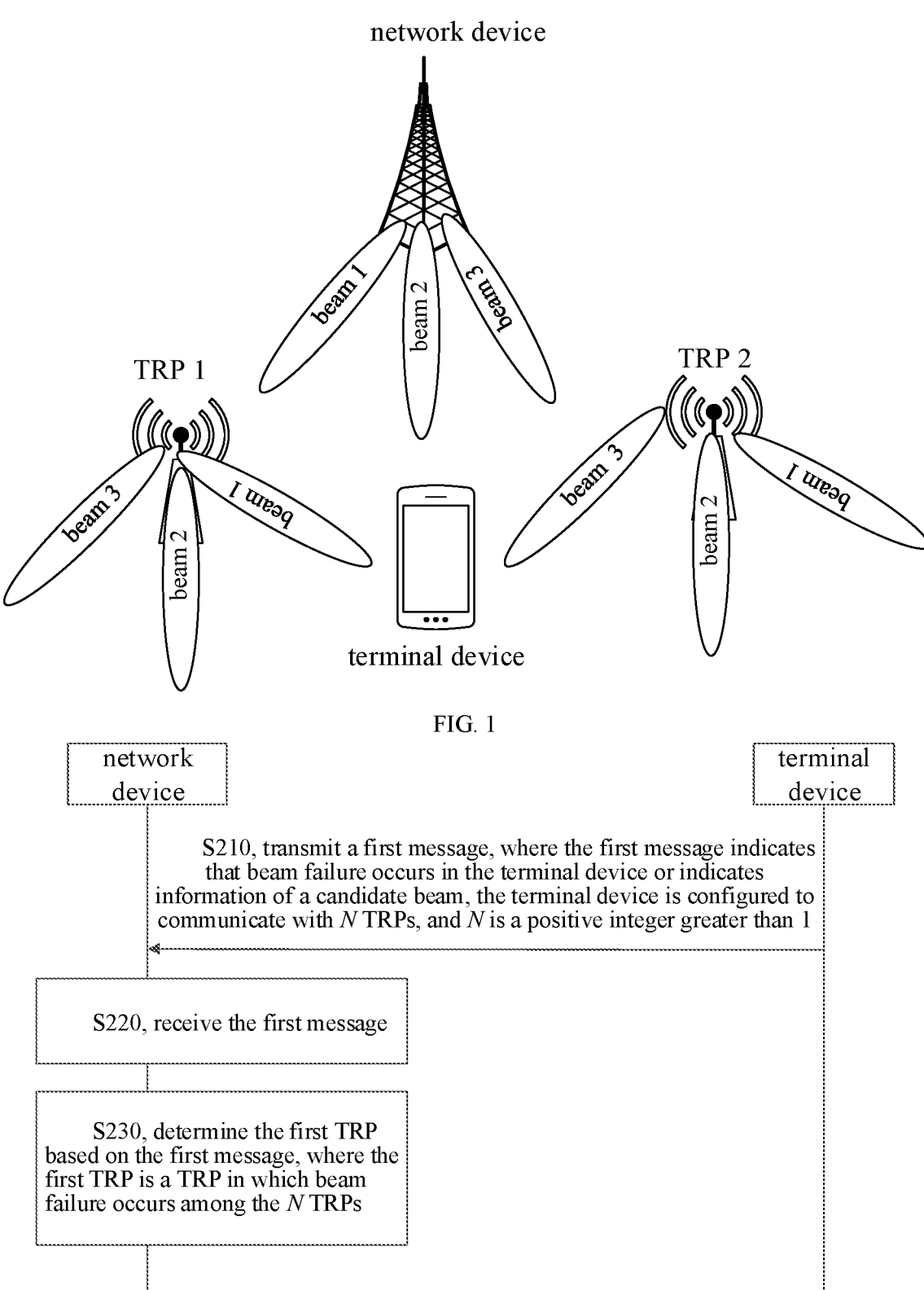

FIG. 1

S210, transmit a first message, where the first message indicates that beam failure occurs in the terminal device or indicates information of a candidate beam, the terminal device is configured to communicate with $N$ TRPs, and $N$ is a positive integer greater than 1

S220, receive the first message

S230, determine the first TRP based on the first message, where the first TRP is a TRP in which beam failure occurs among the $N$ TRPs

FIG. 2

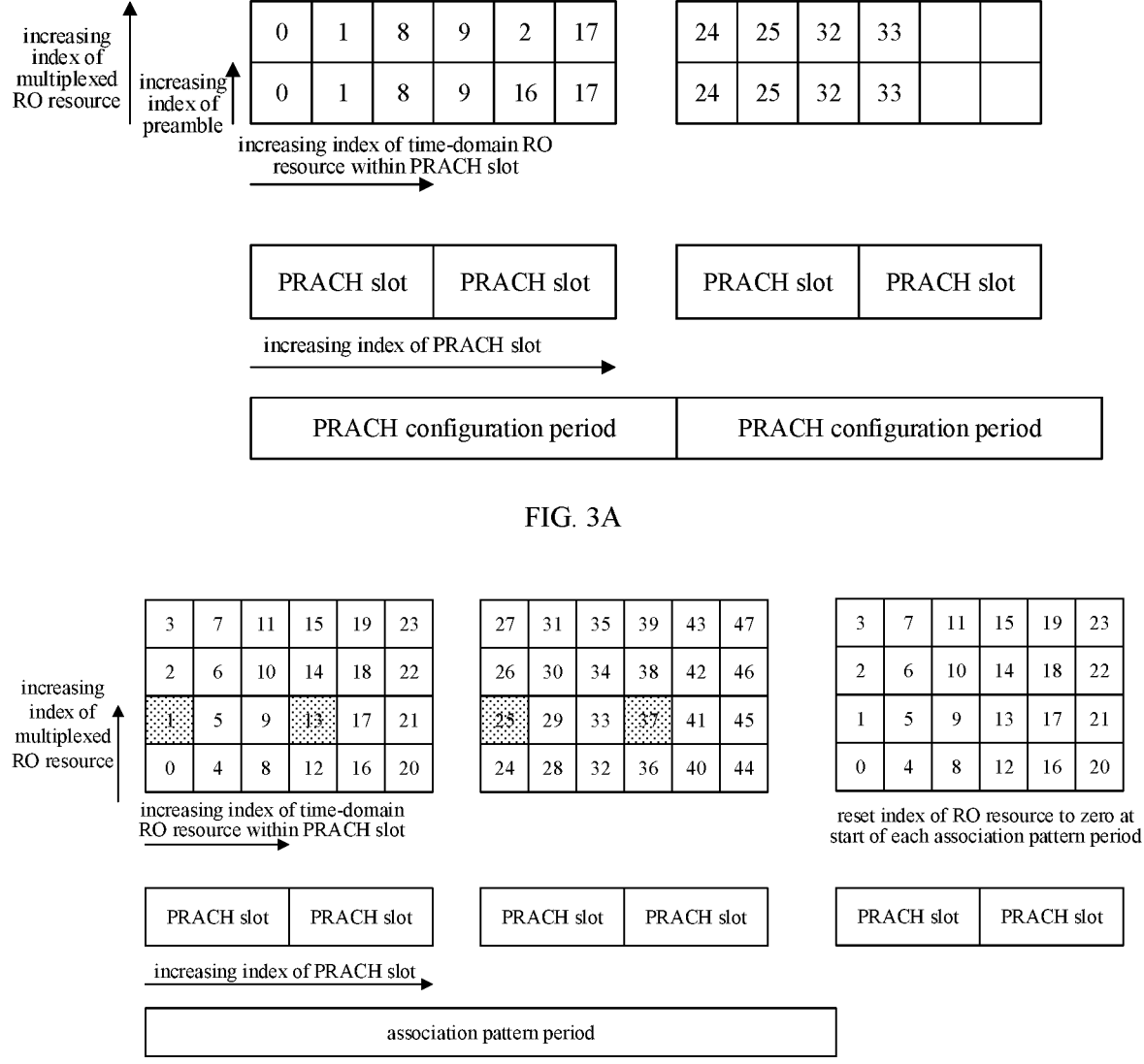

increasing index of multiplexed RO resource increasing index of preamble increasing index of time-domain RO resource within PRACH slot

| 0 | 1 | 8 | 9 | 2 | 17 |
| 0 | 1 | 8 | 9 | 16 | 17 |

| 24 | 25 | 32 | 33 | | |
| 24 | 25 | 32 | 33 | | |

| PRACH slot | PRACH slot |

| PRACH slot | PRACH slot | increasing index of PRACH slot

| PRACH configuration period | PRACH configuration period |

FIG. 3A increasing index of multiplexed RO resource

| 3 | 7 | 11 | 15 | 19 | 23 |
| 2 | 6 | 10 | 14 | 18 | 22 |
| 1 | 5 | 9 | 13 | 17 | 21 |
| 0 | 4 | 8 | 12 | 16 | 20 | increasing index of time-domain RO resource within PRACH slot

| 27 | 31 | 35 | 39 | 43 | 47 |
| 26 | 30 | 34 | 38 | 42 | 46 |
| 25 | 29 | 33 | 37 | 41 | 45 |
| 24 | 28 | 32 | 36 | 40 | 44 |

| 3 | 7 | 11 | 15 | 19 | 23 |
| 2 | 6 | 10 | 14 | 18 | 22 |
| 1 | 5 | 9 | 13 | 17 | 21 |
| 0 | 4 | 8 | 12 | 16 | 20 | reset index of RO resource to zero at start of each association pattern period

| PRACH slot | PRACH slot |

| PRACH slot | PRACH slot |

| PRACH slot | PRACH slot | increasing index of PRACH slot

| association pattern period |

Msg1_FDM=4          ra_OccasionList={1,13,25,37}

FIG. 3B

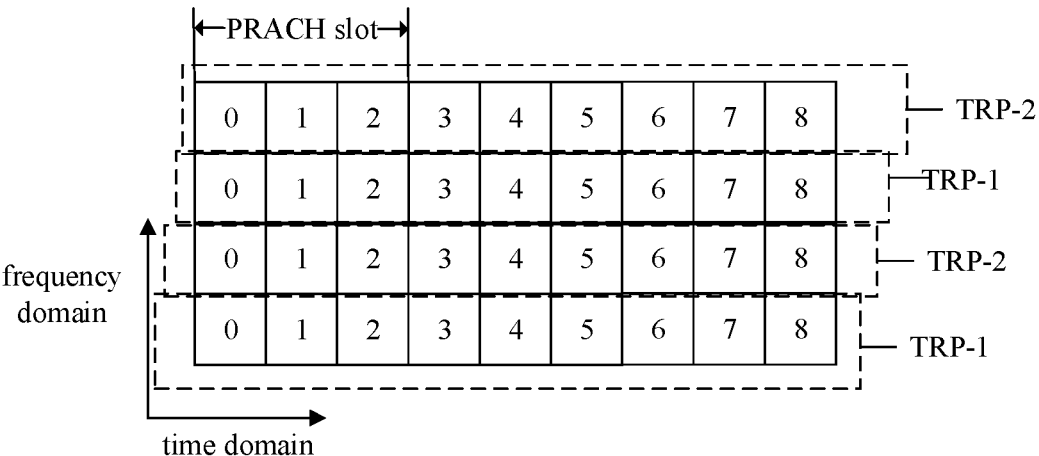
FIG. 4B
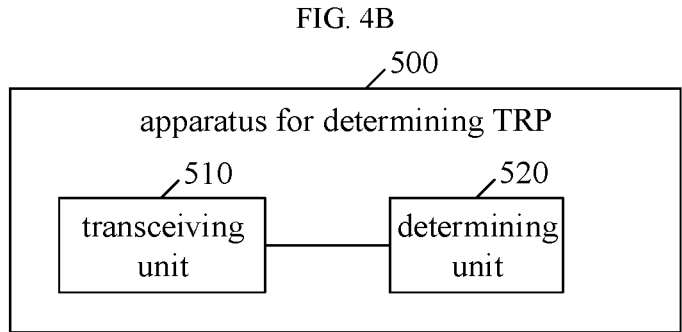
FIG. 5
FIG. 6

METHOD FOR DETERMINING TRANSMISSION RECEPTION POINT, NETWORK DEVICE, AND STORAGE MEDIUM

CROSS-REFERENCE TO RELATED APPLICATION(S)

This application is a National Stage of International Application No. PCT/CN2021/119899, field on Sep. 23, 2021, which claims priority to Chinese Patent Application No. 202011029829.6, filed on Sep. 25, 2020, both of which are incorporated by reference herein.

TECHNICAL FIELD

This disclosure relates to the field of communication technology, in particular to a method for determining a transmission reception point (TRP), a network device, and a storage medium.

BACKGROUND

To solve a problem of narrow beams, a mechanism of beam failure recovery (BFR) or link recovery process is introduced in new radio (NR). Due to rapid changes of channels, quality of beams received by a terminal will fluctuate. When the terminal detects that the quality of the beam received is lower than a certain threshold and the number of occurrences of the quality of the beam received being lower than the certain threshold reaches a preset condition, the BFR process of the terminal is triggered.

The BFR process has been widely studied in Release 15 (Rel-15), Release 16 (Rel-16), and Release 17d (Rel-17). In Rel-15, the BFR process of a special cell (SpCell) is introduced, where the SpCell includes a primary cell (PCell) and a primary secondary cell (PSCell) and the BFR is achieved through a random access channel (RACH) process. In Rel-16, the BFR of a secondary cell (SCell) is introduced, where the BFR of SCell is achieved through processes of SR-BFR and/or BFR-medium access control-control element (BFR-MAC-CE). In Rel-17, the BFR process in a multi-transmission and reception point (M-TRP) scene is introduced, but when the BFR occurs in the M-TRP scene, the base station is unable to determine the TRP where the BFR currently occurs.

SUMMARY

In a first aspect, implementations of the disclosure provide a method for determining a transmission reception point (TRP). The method is applied to a network device and includes: receiving a first message from a terminal device, where the first message indicates that beam failure occurs in the terminal device and/or indicates information of a candidate beam, where the terminal device is configured to communicate with N TRPs, and N is a positive integer greater than 1; and determining a first TRP based on the first message, where the first TRP is a TRP in which the beam failure occurs among the N TRPs.

In a second aspect, implementations of the disclosure provide a network device. The network device includes a transceiver, a memory storing computer programs, and a processor coupled with the memory and the transceiver. The processor is configured to invoke the computer programs to: cause the transceiver to receive a first message from a terminal device, the first message indicating that beam failure occurs in the terminal device and/or indicating information of a candidate beam, the terminal device being configured to communicate with N TRPs, and N being a positive integer greater than 1; and determine a first TRP based on the first message, the first TRP being a TRP in which the beam failure occurs among the N TRPs.

In a third aspect, implementations of the disclosure provide a non-transitory computer-readable storage medium. The non-transitory computer-readable storage medium stores a computer program. The computer program causes a network device to perform part or all of operations of the method of the first aspect.

BRIEF DESCRIPTION OF THE DRAWINGS

To describe technical solutions in implementations of the disclosure more clearly, the following will give a brief introduction to accompanying drawings used for describing implementations. Apparently, the accompanying drawings hereinafter described are some implementations of the disclosure. Based on these drawings, those of ordinary skill in the art can also obtain other drawings without creative effort.

FIG. 1 is a schematic architectural diagram of a wireless communication system provided in implementations of the disclosure.

FIG. 2 is a schematic flow chart of a method for determining a transmission reception point (TRP) provided in implementations of the disclosure.

FIG. 3A is a schematic diagram of a mapping relationship between synchronization signal/physical broadcast channel blocks (SS/PBCH block, SSB) and RACH occasion (RO) resources provided in implementations of the disclosure.

FIG. 3B is a schematic diagram of a mapping relationship between a channel state information-reference signal (CSI-RS) resources and RO resources provided in implementations of the disclosure.

FIG. 4B is a schematic diagram of another division of RO resources provided in implementations of the disclosure.

FIG. 5 is a block diagram illustrating functional units of an apparatus for determining a TRP provided in implementations of the disclosure.

FIG. 6 is a schematic structural diagram of a computer device provided in implementations of the disclosure.

DETAILED DESCRIPTION

Figure 3C:
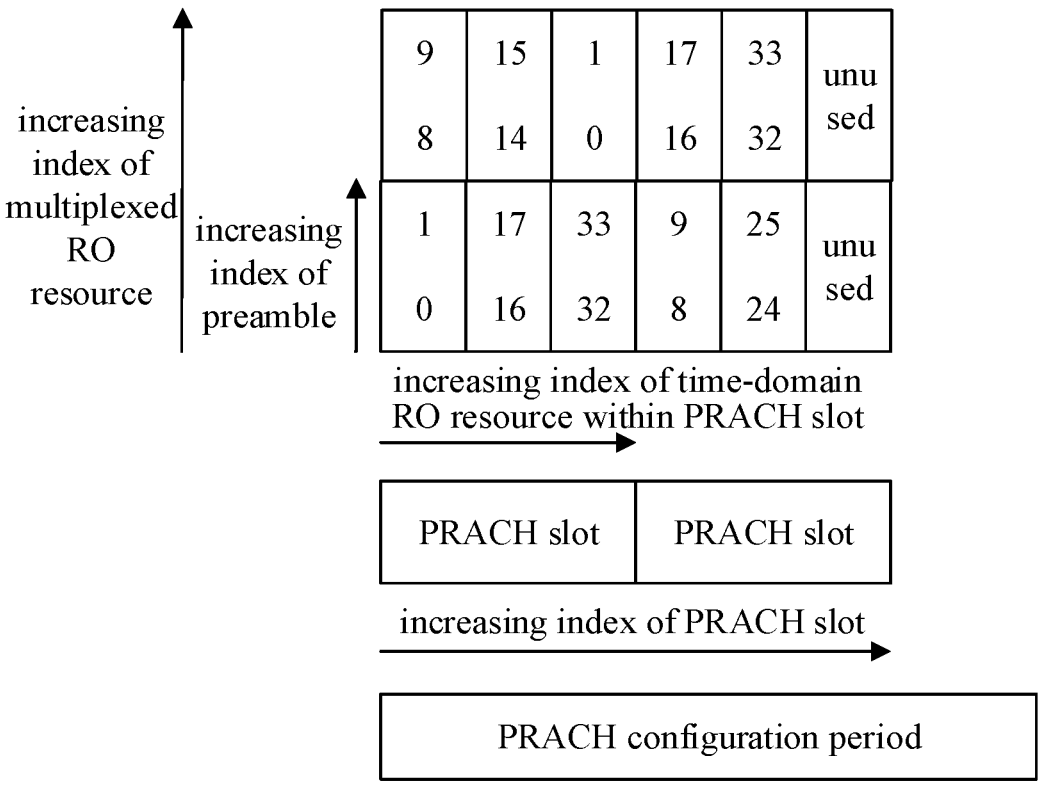
FIG. 3C is a schematic diagram of another mapping relationship between SSBs and RO resources provided in implementations of the disclosure.

The following will describe technical solutions of the disclosure in conjunction with the accompanying figures.

It can be understood that the technical solutions of implementations of the disclosure can be applied to various communication systems, such as a long-term evolution (LTE) system, a 5th generation (5G) mobile communication system (for example, a new radio (NR)), where the 5G mobile communication system includes non-standalone (NSA) 5G mobile communication system and standalone (SA) 5G mobile communication system. The technical solutions provided in the disclosure can also be applied to a communication system that integrates multiple communication technologies, such as a communication system that integrates LTE technologies and NR technologies, or applied to various new future communication systems such as 6th generation (6G) communication systems, 7th generation (7G) communication systems, etc., which is not limited in implementations of the disclosure. The technical solutions of implementations of the disclosure are applicable to different network architectures, including but not limited to a relay network architecture, a dual-link architecture, a vehicle to everything (V2X) architecture, etc.

A network device involved in implementations of the disclosure may be a base station (BS) (or referred to as a base station device) and is a device deployed in a radio access network (RAN) to provide a wireless communication function. For example, a device for providing a base station function in a 2nd generation (2G) network includes a base transceiver station (BTS) and base station controller (BSC), a device for providing a base station function in a 3rd generation (3G) network includes a node B (NodeB) and radio network controller (RNC), a device for providing a base station function in a 4th generation (4G) network includes an evolved NodeB (eNB), a device for providing a base station function in a wireless local area network (WLAN) is an access point (AP), and a device for providing a base station function in a 5G NR is a next generation NodeB (gNB), and the network device can be a device for providing a base station function in a new future communication system.

A terminal device involved in implementations of the disclosure includes a device with a wireless communication function. The terminal device may be a mobile phone, a pad, a computer with a wireless transceiver function, a virtual reality (VR) terminal device, an augmented reality (AR) terminal device, a wireless terminal in industrial control, a wireless terminal in self driving, a wireless terminal in remote medical, a wireless terminal in smart grid, a wireless terminal in smart home, etc. The terminal device may also be a handheld device, a vehicle-mounted device, a wearable device, or a computer device with a wireless communication function, or another processing device connected to a wireless modem, or a terminal device in a future 5G network, or a terminal device in a future evolved public land mobile network (PLMN), etc. In different networks, the terminal device may have different names, such as, user equipment, access terminal, user unit, user station, mobile station (MS), remote station, remote terminal, mobile device, user terminal, terminal, wireless communication device, user agent, or user device, cellular phone, cordless phone, session initiation protocol (SIP) phone, wireless local loop (WLL) station, personal digital assistant (PDA), terminal device in a 5G network or a future evolved network, etc., which is not limited in implementations of the disclosure.

Referring to FIG. 1, FIG. 1 is a schematic diagram of a wireless communication system provided in implementations of the disclosure. As illustrated in FIG. 1, the wireless communication system may include a terminal device and a network device. The network device can include multiple transmission reception points (TRPs), and the multiple TRPs may form a Hyper cell. The TRPs in the Hyper cell share the same Hyper cell ID, and each TRP can communicate with the terminal device. The terminal device can communicate with the multiple TRPs at the same time.

In implementations of the disclosure, one-way communication link from the network device to the terminal device is defined as downlink (DL), data transmitted in the downlink is called downlink data, and a transmission direction of the downlink data is called downlink direction. One-way communication link from the terminal device to the network device is defined as uplink (UL), data transmitted in the uplink is called uplink data, and a transmission direction of the uplink data is called uplink direction.

It should be understood that, in implementations of the disclosure, the term "at least one" refers to one or more, the terms "multiple" or "a plurality of" refers to two or more. The term "and/or" describes an association relationship between associated objects, which means that there can be three relationships. For example, A and/or B can mean A alone, both A and B exist, and B alone, where A, B can be singular or plural. In addition, the character "/" generally indicates that the associated objects are in an "or" relationship. The phrase "at least one (term) of the following" or its equivalent refers to any combination of these terms, including any combination of singular or plural terms. For example, at least one of a, b, or c, can denote: a, b, c, a-b, a-c, b-c, or a-b-c, where a, b, c may be single or multiple.

Furthermore, unless the contrary is described, ordinal numerals such as "first" and "second" involved in implementations of the disclosure are used to distinguish multiple objects and not used to limit an order, a timing sequence, a priority, or importance of each of the multiple objects. For example, first message and second message are only used to distinguish different messages, not used to indicate the difference in content, priority, order of transmission, or importance of the two messages.

The terms "network" and "system" in implementations of the disclosure express the same concept, and a communication system is a communication network. The term "connection" in implementations of the disclosure refers to various connection modes such as direct connection or indirect connection, for example, connecting different devices through communication interfaces, which is not limited herein.

In NR, Release 16 supports multi-transmission and reception point (M-TRP)-based transmission, i.e., simultaneous communication between the terminal device and one or more TRPs. In Release 17, the BFR process in the M-TRP scene is introduced, that is, during communication between the terminal device and the multiple TRPs, when beam failure occurs between the terminal device and a certain TRP, the BFR process is supported. However, when the beam failure occurs in the M-TRP scene, according to existing information, the base station is unable to determine, from TRPs in communication with the terminal device, which TRP is experiencing BFR.

To solve the above problem, the disclosure provides a method for determining a transmission reception point (TRP). A network device receives a first message from a terminal device, where the first message indicates that the terminal device has beam failure and/or indicates information of a candidate beam, and determines a first TRP based on the first message, where the first TRP is a TRP to which the beam failure occurs among N TRPs. Thus, the problem that the network device is unable to determine the TRP with the beam failure in the M-TRP scene can be solved.

To enable those of skill in the art to better understand technical solutions of the disclosure, the technical solutions in implementations of the disclosure will be described clearly and comprehensively below with reference to the accompanying drawings in implementations of the disclosure. Apparently, implementations described herein are merely some implementations, rather than all implementations, of the disclosure. Based on implementations of the disclosure, all other implementations obtained by those of ordinary skill in the art without creative effort shall fall within the protection scope of the disclosure.

Referring to FIG. 2, FIG. 2 is a schematic flow chart of a method for determining a TRP provided in implementations of the disclosure. The method is applied to the communication system illustrated in FIG. 1. As illustrated in FIG. 2, the method includes the following.

S210, a terminal device transmits a first message to a network device, where the first message indicates that beam failure occurs in the terminal device or indicates information of a candidate beam, the terminal device is configured to communicate with N TRPs, and N is a positive integer greater than 1.

In implementations of the disclosure, the terminal device can communicate with multiple TRPs at the same time. Due to rapid changes of channels, quality of beams received by the terminal device will fluctuate. When the terminal device detects that the quality of the beam received is lower than a certain threshold and the number of occurrences of the quality of the beam received being lower than the certain threshold reaches a preset condition, the BFR process of the terminal device is triggered. Specifically, when the terminal device discovers that the beam failure occurs, it can send the first message to the network device, to indicate the network device that the beam failure occurs in the terminal device and the terminal device needs to re-transmit data on a selected new beam.

It should be noted that, the terminal device can be located in the primary Cell (PCell), secondary cell (SCell), or special cell (SpCell). In multi-connection, SpCell is PCell of master cell group (MCG) or primary secondary cell (PSCell) of secondary cell group (SCG). In carrier aggregation and single connection, SpCell is PCell.

Optionally, the first message is a physical random access channel (PRACH), and a time-frequency resource for the PRACH is a first RACH occasion (RO) resource. M RO resources map to one synchronization signal/physical broadcast channel block (SS/PBCH block, SSB) or one channel state information-reference signal (CSI-RS) resource. The M RO resources include the first RO resource, and M is a positive integer greater than 1.

When the terminal device is located in PCell, if the terminal device measures that the channel quality of the currently working beam is not good, there is a need to initiate the BFR process, which is achieved by random access. Specifically, the terminal device selects a specific beam, to re-find a beam having a channel quality which satisfies the requirement. Specifically, the terminal device selects anew available SSB or CSI-RS resource, where different SSBs or CSI-RS resources correspond to different beams.

Furthermore, when a beam failure event is detected, the terminal device transmits a beam failure recovery request to the network device over the PRACH, and transmits a specific beam selected by the terminal device to the network device over the PRACH. The time-frequency resource for the PRACH is physical random access channel transmission occasion (PRACH transmission occasion), or called PRACH occasion or RACH occasion (RO), which is for transmitting the preamble. The RO resource is associated with some certain DL signals, for example, SSB, CSI-RS resource, or the like. Thus, based on a mapping relationship between RO resources and SSBs or CSI-RS resources, a SSB or a CSI-RS resource associated with the first RO resource can be determined, and thus the corresponding TRP can be determined. The mapping relationship between SSBs and RO resources can be one-to-many, that is, M can be 2, 4, 8, 16, 32, or the like. M can be configured via higher layer signaling (which can be indicated by carrying ssb-per-RACH-Occation in a higher layer parameter BeamFailureRecoveryConfig). As illustrated in FIG. 3A, the terminal device is transmitting 10 SSBs, where indexes of the 10

SSBs are respectively $\{0, 1, 8, 9, 16, 17, 24, 25, 32, 33\}$. Each SSB maps to two RO resources, that is, M=2, and there are two frequency division multiplexed RO resources. One PRACH slot includes three time-domain RO resources, and one PRACH configuration period includes two PRACH slots. The mapping relationship between CSI-RS resources and RO resources is one-to-many, that is, M can be 2, 4, 8, 16, 32, or the like. M can be configured via higher layer signaling. As illustrated in FIG. 3B, msg1-FDM=4, which means that there are four frequency-domain PRACH occasions in one time-domain PRACH occasion. One PRACH slot includes three time-domain RO resources, and one PRACH configuration period includes two PRACH slots. ra_OccasionList=$\{1, 13, 25, 37\}$, which indicates that a set of RO resources available for PEACH transmission bound with the index of the CSI-RS resource is $\{1, 13, 25, 37\}$.

In some implementations, the first message is the PRACH, the time-frequency resource for the PRACH is the first RO resource, and the PRACH includes a first preamble. The first RO resource maps to L SSBs, and L is a positive integer.

The mapping relationship between SSBs and RO resources can be many-to-one, one-to-one, that is, L can be 2, 4, 8, 16, 32, or the like. L can be configured via higher layer signaling. As illustrated in FIG. 3C, the terminal device is transmitting 10 SSBs, where indexes of the 10 SSBs are respectively $\{0, 1, 8, 9, 16, 17, 24, 25, 32, 33\}$. Each two SSBs map to one RO resource, that is, L=2, and there are two frequency division multiplexed RO resources. One PRACH slot includes three time-domain RO resources, and one PRACH configuration period includes 2 PRACH slots. Since one RO resource can map to multiple SSBs, the first TRP cannot be determined directly based on the first RO resource. The PRACH also needs to include a first preamble. Based on the first preamble, the corresponding TRP can be determined.

Optionally, the first message is a beam failure recovery-scheduling request (BFR-SR).

When the terminal device is in the SCell, the BFR mechanism applied to the SCell is different from the BFR mechanism applied to PCell. When the terminal device is configured to detect occurrence of beam failure of a certain SCell, and after any beam failure is detected by the terminal device, the terminal device needs to transmit to the base station a medium access control-control element (MAC-CE) indicating the beam failure of the SCell. When the terminal device has no uplink transmission resource to transmit the MAC-CE indicating the beam failure of the SCell, the terminal device needs to send a scheduling request (SR) of BFR to the base station. In implementations of the disclosure, the scheduling request related to the beam failure recovery of the SCell is referred to as BFR-SR, which includes the BFR-SR configuration (i.e., physical uplink control channel (PUCCH) configuration) for the SCell configured in the uplink PCell by the serving base station (i.e., a base station providing services to the terminal device and managing the PCell and SCell). After receiving the scheduling request of the beam failure recovery for the SCell, the base station may send uplink authorization to the terminal device, for the terminal device to transmit the MAC-CE indicating the beam failure of the SCell, or directly send a response to the beam failure recovery, to adjust the beam serving the terminal device.

Optionally, the first message is a medium access control-control element (MAC-CE), and the MAC-CE further includes q1 set information or TRP information.

When the terminal device detects the beam failure of a certain SCell, the terminal device generates the MAC-CE indicating the beam failure related to the SCell, and reports a candidate beam and a corresponding L1-SINR through the MAC-CE. The q1 set information may be indexes of a set of candidate beams.

S220, the network device receives the first message.

S230, the network device determines the first TRP based on the first message, where the first TRP is a TRP in which the beam failure occurs among the N TRPs.

In implementations of the disclosure, for the BFR process of contention based random access (CBRA), after the network deice receives the first message, the network device can determine, based on the information carried in the first message, the TRP where the beam failure occurs. As such, the network device can determine in the preamble stage the TRP where the beam failure occurs, to adjust the beam serving the terminal device, which is convenient for system beam management.

Optionally, the network device can identify the sequence number of the TRP where the beam failure occurs through the RO resource for the received PRACH. The TRP identification method can be applied to the case where one SSB or one CSI-RS resource maps to one or more RO resources.

Optionally, the network device can identify the sequence number of the TRP where the beam failure occurs through the preamble sequence of the received PRACH. The TRP identification method can be applied to the case where multiple SSBs or CSI-RS resources map to one or more RO resources.

Optionally, the first message is a physical random access channel (PRACH), and a time-frequency resource for the PRACH is a first RO resource, and in the case that M RO For example, the total number of TRPs is N, one SSB maps to 8 RO resources, and the number of TRPs is 2. In this case, first four RO resources correspond to one TRP, and the remaining RO resources correspond to another TRP. For another example, the total number of TRPs is N, and one SSB maps to M RO resources. In this case, M RO resources are divided into N groups, first $M-\lfloor M/N \rfloor * N$ groups among the N groups each include any one of $\lceil M/N \rceil$ RO resources, $\lfloor M/N \rfloor$ RO resources, or M/N RO resources, and last $N-M+\lfloor M/N \rfloor * N$ groups among the N groups each include $\lfloor M/N \rfloor$ RO resources, where $\lfloor \ \rfloor$ is rounding down, $\lceil \ \rceil$ is rounding up, and one group of RO resources corresponds to one TRP.

Optionally, dividing the M RO resources into the N groups of RO resources includes: obtaining the N groups of RO resources by classifying adjacent M/N RO resources among the M RO resources into one group of RO resources.

Figure 4A:
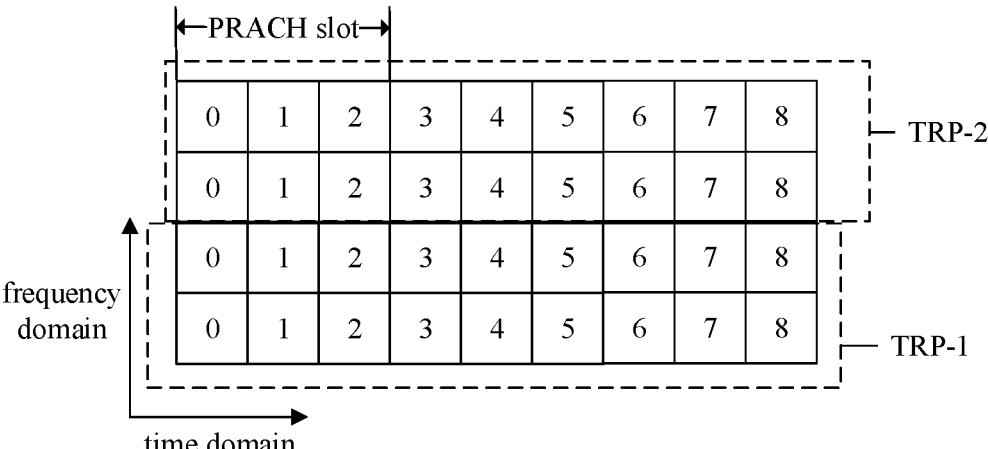
FIG. 4A is a schematic diagram of division of RO resources provided in implementations of the disclosure.

Specifically, in the case that one SSB maps to M RO resources, starting from the RO resource with the smallest index, consecutive adjacent $\lceil M/N \rceil$ RO resources, $\lfloor M/N \rfloor$ RO resources, or M/N RO resources are classified into one group. For example, as illustrated in FIG. 4A, the total number of TRPs is 2 and one SSB maps to four RO resources. In this case, starting from the RO resource with the index of 1, consecutive adjacent two RO resources in frequency-domain or consecutive adjacent two RO resources in sequence number are classified into one group, that is, in each SSB, first half RO resources correspond to TRP-1 and last half RO resources correspond to TRP-2. The first RO resource may be an index of the RO resource, and the first mapping relationship table may be a mapping table between indexes of RO resources, indexes of SSBs, and indexes of TRPs. As illustrated in Table 1, the mapping table between RO resources and TRPs in FIG. 4A is as follows.

TABLE 1

| RO-1 | RO-2 | RO-3 | RO-4 | RO-5 | RO-6 | RO-7 | RO-8 | RO-9 | RO-10 | RO-11 | RO-12 |
|---|---|---|---|---|---|---|---|---|---|---|---|
| SSB-1 | SSB-1 | SSB-1 | SSB-1 | SSB-2 | SSB-2 | SSB-2 | SSB-2 | SSB-3 | SSB-3 | SSB-3 | SSB-3 |
| TRP-1 | TRP-1 | TRP-2 | TRP-2 | TRP-1 | TRP-1 | TRP-2 | TRP-2 | TRP-1 | TRP-1 | TRP-2 | TRP-2 | resources map to one SSB or one CSI-RS resource, determining the first TRP based on the first message includes: dividing the M RO resources into N groups of RO resources; and determining the first TRP corresponding to the first RO resource based on a first mapping relationship between the N groups of RO resources and the N TRPs.

The higher layer configures 1/M (L1 parameter: SSB-per-rach-occasion) SSB to be associated with one RO resource (frequency-domain) through parameter ssb-perRACH-Oc-casionAndCB-PreamblesPerSSB. When one SSB maps to M RO resources, i.e., M>1, one SSB maps to M consecutive valid RO resources (frequency-domain), and each RO resource correspond to one preamble index. The set of sequence numbers of the preamble supported by each TRP is configured via higher layer signaling. Thus, the first TRP can be determined based on the preamble index corresponding to the first RO resource.

Specifically, the RO resources corresponding to one SSB are divided, and each group of RO resources after division corresponds to one TRP. Thereby, the network device can determine which group of RO resources the first RO resource belongs to, based on the mapping relationship between SSBs, RO resources, and TRPs, and then determine the TRP corresponding to the first RO resource based on the first mapping relationship between this group of RO resources and TRP.

Specifically, in the case that one CSI-RS resource maps to resources, starting rom the RO resource with the smallest index, consecutive adjacent $\lceil M/N \rceil$ RO resources, $\lfloor M/N \rfloor$ RO resources, or M/N RO resources in the set of RO resources are classified into one group. For example, as illustrated in FIG. 3B, the total number of TRPs is 2, one CSI-RS resource maps to four RO resources, and a set of RO resources available for PEACH transmission bound with the index of the CSI-RS resource is {1, 13, 25, 37}. In this case, starting from the RO resource with the index of 1, RO resource 1 and RO resource 13 are classified into one group and RO resource 25 and RO resource 37 are classified into another group, that is, in the set of RO resources, first half RO resources correspond to TRP-1 and last half RO resources correspond to TRP-2. The first RO resource may be an index of the RO resource, and the first mapping relationship table may be a mapping table between indexes of RO resources, indexes of CSI-RS resources, and indexes of TRPs. As illustrated in Table 2, the mapping table between RO resources and TRPs in FIG. 3B is as follows.

TABLE 2

| RO-1 | RO-13 | RO-25 | RO-27 |
|---|---|---|---|
| CSI-RS-1 | CSI-RS-1 | CSI-RS-1 | CSI-RS-1 |

TABLE 2-continued

| RO-1 | RO-13 | RO-25 | RO-27 |
|------|-------|-------|-------|
| TRP-1 | TRP-1 | TRP-2 | TRP-2 |

In a possible example, dividing the M RO resources into the N groups of RO resources includes: obtaining the N groups of RO resources by classifying M/N RO resources separated by N−1 among the M RO resources into one group of RO resources.

In the case that the total number of TRPs is 2, and one SSB maps to M RO resources. All RO resources with odd sequence numbers or all odd-numbered RO resources correspond to TRP-1, and all RO resources with even sequence numbers or all even-numbered RO resources correspond to TRP-2. Alternatively, all RO resources with odd sequence numbers or all odd-numbered RO resources correspond to TRP-2, and all RO resources with even sequence numbers or all even-numbered RO resources correspond to TRP-1.

Specifically, in the case that one SSB maps to M RO resources, starting from the RO resource with the smallest index, $\lceil M/N \rceil$ RO resources, $\lfloor M/N \rfloor$ RO resources, or M/N RO resources separated by (N−1) are classified into one group. For example, as illustrated in FIG. 4B, the total number of TRPs is 2 and one SSB maps to four RO resources. In this case, starting from the RO resource with the index of 1, two RO resources separated by 1 in frequency-domain are classified into one group, that is, in the SSB, RO resources with odd indexes correspond to TRP-1 and RO resources with even indexes correspond to TRP-2. The first RO resource may be an index of the RO resource, and the first mapping relationship table may be a mapping table between indexes of RO resources and indexes of TRPs. As illustrated in Table 3, the mapping table between RO resources and TRPs in FIG. 4B is as follows.

TABLE 3

| RO-1 | RO-2 | RO-3 | RO-4 | RO-5 | RO-6 | RO-7 | RO-8 | RO-9 | RO-10 | RO-11 | RO-12 |
|------|------|------|------|------|------|------|------|------|-------|-------|-------|
| SSB-1 | SSB-1 | SSB-1 | SSB-1 | SSB-2 | SSB-2 | SSB-2 | SSB-2 | SSB-3 | SSB-3 | SSB-3 | SSB-3 |
| TRP-1 | TRP-2 | TRP-1 | TRP-2 | TRP-1 | TRP-2 | TRP-1 | TRP-2 | TRP-1 | TRP-2 | TRP-1 | TRP-2 |

In the case that the total number of TRPs is 2, and one CSI-RS resource maps to M RO resources. All RO resources with odd sequence numbers or all odd-numbered RO resources correspond to TRP-1, and all RO resources with even sequence numbers or all even-numbered RO resources correspond to TRP-2. Alternatively, all RO resources with odd sequence numbers or all odd-numbered RO resources correspond to TRP-2, and all RO resources with even sequence numbers or all even-numbered RO resources correspond to TRP-1.

Specifically, in the case that one CSI-RS resource maps to M RO resources, starting from the RO resource with the smallest index, $\lceil M/N \rceil$ RO resources, $\lfloor M/N \rfloor$ RO resources, or M/N RO resources separated by (N−1) in the set of RO resources are classified into one group. For example, as illustrated in FIG. 3B, the total number of TRPs is 2, one CSI-RS resource maps to four RO resources. In this case, starting from the RO resource with the index of 1, RO resource 1 and RO resource 25 are classified into one group and RO resource 13 and RO resource 37 are classified into another group, that is, in the set of RO resources, RO resources with odd index correspond to TRP-1 and RO resources with even index correspond to TRP-2. The first RO resource may be an index of the RO resource, and the first mapping relationship table may be a mapping table between indexes of RO resources, indexes of CSI-RS resources, and indexes of TRPs. As illustrated in Table 4, the mapping table between RO resources and TRPs in FIG. 3B is as follows.

TABLE 4

| RO-1 | RO-13 | RO-25 | RO-27 |
|------|-------|-------|-------|
| CSI-RS-1 TRP-1 | CSI-RS-1 TRP-2 | CSI-RS-1 TRP-1 | CSI-RS-1 TRP-2 |

In a possible implementation, the first message is a PRACH, a time-frequency resource for the PRACH is a first RO resource, and the PRACH includes a first preamble.

On condition that the first RO resource maps to L SSBs, L is a positive integer, and determining the first TRP based on the first message includes: determining the first TRP corresponding to the first preamble based on a second mapping relationship between preambles and the N TRPs.

Specifically, one SSB maps to one or less RO resource, i.e., when L>1 and M<1 and L SSBs map one RO resource, the TRP with the beam failure can be determined directly based on the preamble index corresponding to the SSB. Thus, the network device can determine the first TRP corresponding to the first preamble based on the second mapping relationship between preambles and N TRPs. The second mapping relationship may be configured via higher layer signaling, i.e., the set of sequence numbers of preamble supported by each TRP can be configured via higher layer signaling.

In a possible implementation, the first message is a BFR-SR, where the BFR-SR is a PUCCH resource for carrying SR information of the BFR process. Determining the first TRP based on the first message includes: determining the first TRP based on a third mapping relationship between BFR-SRs and the TRPs.

When the terminal device does not have uplink transmission resources to transmit the MAC-CE indicating the beam failure of the SCell, the terminal device needs to send the BFR-SR to the network device through PUCCH, to request uplink resources. The different PUCCH resources occupied by the BFR-SR can correspond to different TRPs. The network device can determine the first TRP based on the third mapping relationship between the positions of the resources for the received BFR-SR and the TRPs. The third mapping relationship may be configured via higher layer signaling, i.e., the PUCCH resource supported by each TRP is configured via higher layer signaling.

In a possible implementation, the first message is a medium access control-control element (MAC-CE), and the first message further includes q1 set information or TRP information. Determining the first TRP based on the first message includes: determining the first TRP based on a fourth mapping relationship between the q1 set information and the N TRPs or based on the TRP information.

The terminal device can perform the beam failure recovery through the MAC-CE when the beam failure occurs in the SCell. The MAC-CE may carry the q1 set information or the TRP information, to inform the network device of the TRP with the beam failure. The q1 set information may be indexes of the set of candidate beams, where indexes of candidate beams of different TRPs are different. The TRP corresponding to the q1 set information may be determined based on the fourth mapping relationship between indexes of candidate beams and TRPs. The fourth mapping relationship may be configured via higher layer signaling, i.e., an index of the candidate beam supported by each TRP can be configured via higher layer signaling.

As can be seen, in the method for determining the TRP, the network device receives the first message from the terminal device, where the first message indicates that the beam failure occurs in the terminal device and/or indicates information of a candidate beam, and determines the first TRP based on the first message, where the first TRP is a TRP in which the beam failure occurs among the N TRPs. In the disclosure, during communication between the terminal device and the N TRPs, if the beam failure occurs, the network device can determine the TRP in which the beam failure occurs from the N TRPs based on the first message. Thus, the problem that the network device is unable to determine the TRP with the beam failure in the M-TRP scene is solved.

The above technical solutions of implementations of the disclosure are mainly described from the viewpoint of execution of the method. It can be understood that, in order to implement the above functions, an electronic equipment includes hardware structures and/or software modules corresponding to the respective functions. Those of skill in the art should readily recognize that, in combination with the exemplary units and scheme steps or operations described in implementations provided in the specification herein, the disclosure can be implemented in hardware or a combination of hardware and computer software. Whether a function is implemented by way of hardware or computer software driving hardware depends on the particular application and design constraints of the technical solutions. Those of skill in the art may use different methods to implement the described functions for each particular application, but such implementations should not be considered as beyond the scope of the disclosure.

In implementations of the disclosure, functional units may be divided for the electronic equipment in accordance with the above method examples. For example, functional units may be divided according to corresponding functions, and two or more functions may be integrated into one processing unit. The above-mentioned integrated unit can be implemented in the form of hardware or software functional units. It should be noted that the division of units in implementations of the disclosure is schematic and is merely a logical function division, there may be other division manners in actual implementation.

Referring to FIG. 5, FIG. 5 is a block diagram illustrating functional units of an apparatus 500 for determining a TRP provided in implementations of the disclosure. The apparatus 500 can be applied to a terminal device. The apparatus 500 can be applied to a network device. The apparatus 500 includes a transceiving unit 510 and a determining unit 520.

In a possible implementation, the apparatus 500 is used to execute each process and step corresponding to the network device in the method for determining the TRP.

The transceiving unit 510 is configured to receive a first message from a terminal device, where the first message indicates that beam failure occurs in the terminal device and/or indicates information of a candidate beam, the ter-minal device is configured to communicate with N TRPs, and N is a positive integer greater than 1. The determining unit 520 is configured to determine a first TRP based on the first message, where the first TRP is a TRP in which the beam failure occurs among the N TRPs.

Optionally, the first message is a PRACH, and a time-frequency resource for the PRACH is a first RO resource. When one SSB or one CSI-RS resource maps to M RO resources, the M RO resources include the first RO resource, and M is a positive integer greater than 1, the determining unit 520 is configured to: divide the M RO resources into N groups of RO resources; and determine the first TRP corresponding to the first RO resource based on a first mapping relationship between the N groups of RO resources and the N TRPs.

Optionally, in terms of dividing the M RO resources into the N groups of RO resources, the determining unit 520 is configured to: obtain the N groups of RO resources by classifying adjacent M/N RO resources among the M RO resources into one group of RO resources; or obtain the N groups of RO resources by classifying M/N RO resources separated by N−1 among the M RO resources into one group of RO resources.

Optionally, the first message is a PRACH, a time-frequency resource for the PRACH is a first RO resource, and the PRACH includes a first preamble. When the first RO resource maps to L SSBs, and L is a positive integer, the determining unit 520 is configured to: determine the first TRP corresponding to the first preamble based on a second mapping relationship between preambles and the N TRPs.

Optionally, the first message is a BFR-SR. The determining unit 520 is configured to: determine the first TRP based on a third mapping relationship between BFR-SRs and the TRPs.

Optionally, the first message is a medium access control-control element (MAC-CE), and the MAC-CE includes q1 set information or TRP information. The determining unit 520 is configured to: determine the first TRP based on a fourth mapping relationship between the q1 set information and the N TRPs or based on the TRP information.

In another possible implementation, the apparatus 500 is used to execute each process and step corresponding to the terminal device in the method for determining the TRP.

The transceiving unit 510 is configured to transmit a first message to a network device, where the first message indicates that beam failure occurs in the terminal device and/or indicates information of a candidate beam, the terminal device is configured to communicate with N TRPs, the first TRP is a TRP in which the beam failure occurs among the N TRPs, and N is a positive integer greater than 1.

Optionally, the first message is a PRACH, a time-frequency resource for the PRACH is a first RO resource, M RO resources map to one SSB or one CSI-RS resource, the M RO resources include the first RO resource, and M is a positive integer greater than 1.

Optionally, the first message is a PRACH, a time-frequency resource for the PRACH is a first RO resource, the PRACH includes a first preamble, the first RO resource maps to L SSBs, and L is a positive integer.

Optionally, the first message is a BFR-SR.

Optionally, the first message is a MAC-CE, and the MAC-CE includes q1 set information or TRP information.

It can be understood that, the functions of various program modules of the apparatus for determining the transmission reception point of implementations of the discourse may be achieved in accordance with the method in the above-mentioned method implementations. The implementation process thereof can be referred to the related description of the above-mentioned method implementations and will not be repeated herein.

It should be understood that, the apparatus 500 herein is embodied in the form of functional units. The term "unit" herein may refer to an application specific integrated circuit (ASIC), electronic circuit, a processor (e.g., shared processor, specific processor, group processor, etc.) for executing one or more software or firmware programs, and a memory, a merge logic circuit, and/or other appropriate components that support the described functions. In an optional example, it will be understood by those skilled in the art that the apparatus 500 may be the terminal device and the network device in the above-described implementations. The apparatus 500 may be used to perform various processes and/or steps corresponding to the terminal device and the network device in the above-described method implementations, which will not be repeated herein.

The apparatus 500 of each of the above-mentioned schemes has the function of achieving the corresponding steps performed by the terminal device and the network device of the above-mentioned method. The function can be achieved by hardware or by hardware executing corresponding software. The hardware or software includes one or more modules corresponding to the above functions. For example, the determining unit 520 may be replaced by the processor. The transceiving unit 510 may be replaced by a transmitter and a receiver, to perform the transmission and reception operations and related processing operations in various implementations, respectively.

Referring to FIG. 6, FIG. 6 is a schematic structural diagram of a computer device provided in implementations of the disclosure. The computer device includes one or more processors, one or more memories, one or more communication interfaces, and one or more programs. The one or more programs are stored in the one or more memories and configured to be executed by the one or more processors.

In a possible implementation, the computer device is a network device. The one or more programs include instructions configured to perform: receiving a first message from a terminal device, where the first message indicates that beam failure occurs in the terminal device and/or indicates information of a candidate beam, the terminal device is configured to communicate with N TRPs, and N is a positive integer greater than 1; and determining a first TRP based on the first message, where the first TRP is a TRP in which the beam failure occurs among the N TRPs.

Optionally, the first message is a PRACH, and a time-frequency resource for the PRACH is a first RO resource. When one SSB or one CSI-RS resource maps to M RO resources, the M RO resources include the first RO resource, and M is a positive integer greater than 1, in terms of determining the first TRP based on the first message, the programs further include instructions configured to perform: dividing the M RO resources into N groups of RO resources; and determining the first TRP corresponding to the first RO resource based on a first mapping relationship between the N groups of RO resources and the N TRPs.

Optionally, in terms of dividing the M RO resources into the N groups of RO resources, the programs further include instructions configured to perform: obtaining the N groups of RO resources by classifying adjacent M/N RO resources among the M RO resources into one group of RO resources; or obtaining the N groups of RO resources by classifying M/N RO resources separated by N−1 among the M RO resources into one group of RO resources.

Optionally, the first message is a PRACH, a time-frequency resource for the PRACH is a first RO resource, and the PRACH includes a first preamble. When the first RO resource maps to L SSBs, and L is a positive integer, in terms of determining the first TRP based on the first message, the programs further include instructions configured to perform: determining the first TRP corresponding to the first preamble based on a second mapping relationship between preambles and the N TRPs.

Optionally, the first message is a BFR-SR. In terms of determining the first TRP based on the first message, the programs further include instructions configured to perform: determining the first TRP based on a third mapping relationship between BFR-SRs and the TRPs.

Optionally, the first message is a MAC-CE, and the MAC-CE includes q1 set information or TRP information. In terms of determining the first TRP based on the first message, the programs further include instructions configured to perform: determining the first TRP based on a fourth mapping relationship between the q1 set information and the N TRPs or based on the TRP information.

In a possible implementation, the computer device is a terminal device. The one or more programs include instructions configured to perform: transmitting a first message to a network device, where the first message indicates that beam failure occurs in the terminal device and/or indicates information of a candidate beam, the terminal device is configured to communicate with N TRPs, the first TRP is a TRP in which the beam failure occurs among the N TRPs, and N is a positive integer greater than 1.

Optionally, the first message is a PRACH, a time-frequency resource for the PRACH is a first RO resource, M RO resources map to one SSB or one CSI-RS resource, the M RO resources include the first RO resource, and M is a positive integer greater than 1.

Optionally, the first message is a PRACH, a time-frequency resource for the PRACH is a first RO resource, the PRACH includes a first preamble, the first RO resource maps to L SSBs, and L is a positive integer.

Optionally, the first message is a BFR-SR.

Optionally, the first message is a MAC-CE, and the MAC-CE includes q1 set information or TRP information.

It should be noted that, for the specific implementation process of implementations of the disclosure, reference may be made to the specific implementation process described in the above method implementations, which will not be repeated herein.

A computer storage medium is further provided in implementations of the disclosure. The computer storage medium stores a computer program for electronic data interchange, where the computer program causes a computer to perform some or all operations of any of the method described in the above method implementations.

A computer program product is further provided in implementations of the disclosure. The computer program product includes a non-transitory computer-readable storage medium storing a computer program. The computer program is operable to cause a computer to perform some or all operations of any of the method described in the above method implementations. The computer program product may be a software installation package.

Implementations of the disclosure provide a method for determining a TRP, a network device, and a storage medium, to solve the problem that a network device is unable to determine a TRP with beam failure in an M-TRP scene.

Implementations of the disclosure provide a method for determining a TRP. The method is applied to a network device and includes: receiving a first message from a terminal device, where the first message indicates that beam failure occurs in the terminal device and/or indicates information of a candidate beam, where the terminal device is configured to communicate with N TRPs, and N is a positive integer greater than 1; and determining a first TRP based on the first message, where the first TRP is a TRP in which the beam failure occurs among the N TRPs.

Implementations of the disclosure provide a method for determining a TRP. The method is applied to a terminal device and includes: transmitting a first message to a network device, where the first message is for the network device to determine a first TRP in which beam failure occurs, the terminal device is configured to communicate with N TRPs, the first TRP is a TRP in which the beam failure occurs among the N TRPs, and N is a positive integer greater than 1.

Implementations of the disclosure provide an apparatus for determining a TRP. The apparatus is applied to a network device and includes: a transceiving unit configured to receive a first message from a terminal device, where the first message indicates that beam failure occurs in the terminal device or indicates information of a candidate beam, the terminal device is configured to communicate with N TRPs, and N is a positive integer greater than 1; and a determining unit configured to determine a first TRP based on the first message, the first TRP is a TRP in which the beam failure occurs among the N TRPs.

Implementations of the disclosure provide an apparatus for determining a TRP. The apparatus is applied to a terminal device and includes: a transceiving unit configured to transmit a first message to a network device, where the first message is for the network device to determine a first TRP in which beam failure occurs, the terminal device is configured to communicate with N TRPs, the first TRP is a TRP in which the beam failure occurs among the N TRPs, and N is a positive integer greater than 1.

Implementations of the disclosure provide a network device. The network device includes a processor, a memory, a communication interface, and one or more programs stored in the memory. The one or more programs are configured to be executed by the processor and include instructions configured to perform part or all of operations of the method of the above.

Implementations of the disclosure provide a terminal device. The terminal device includes a processor, a memory, a communication interface, and one or more programs stored in the memory. The one or more programs are configured to be executed by the processor and include instructions configured to perform part or all of operations of the method of the above.

Implementations of the disclosure provide a computer-readable storage medium. The computer-readable storage medium stores a computer program for electronic data interchange. The computer program causes a computer to perform part or all of operations of the method of the above.

Implementations of the disclosure provide a computer program product. The computer program product includes a non-transitory computer-readable storage medium storing a computer program. The computer program is operable to cause a computer to perform part or all operations of the method described above. The computer program product may be a software installation package.

As can be seen, in implementations of the disclosure, the network device receives the first message from the terminal device, where the first message indicates that beam failure occurs in the terminal device and/or indicates information of a candidate beam, and determines the first TRP based on the first message, where the first TRP is a TRP in which the beam failure occurs among the N TRPs. In the disclosure, during communication between the terminal device and the N TRPs, if the beam failure occurs, the network device can determine the TRP in which the beam failure occurs from the N TRPs based on the first message. Thus, the problem that the network device is unable to determine the TRP with the beam failure in the M-TRP scene is solved.

It should be noted that, for the sake of simplicity, the above method implementations are described as a series of action combinations, however, it will be appreciated by those skilled in the art that the disclosure is not limited by the sequence of actions described. According to the disclosure, certain steps or operations may be performed in other order or simultaneously. Besides, it will be appreciated by those skilled in the art that implementations described in the specification are exemplary implementations and the actions and modules involved are not necessarily essential to the disclosure.

In the above implementations, the description of each implementation has its own emphasis. For the parts not described in detail in one implementation, reference may be made to related descriptions in other implementations.

It will be appreciated that the apparatuses disclosed in implementations provided in the disclosure may also be implemented in various other manners. For example, the above apparatus implementations are merely illustrative, e.g., the division of units is only a division of logical functions, and other manners of division may also available in practice, e.g., multiple units or assemblies may be combined or may be integrated into another system, or some features may be ignored or omitted. In other respects, the coupling or direct coupling or communication connection as illustrated or discussed may be an indirect coupling or communication connection through some interface, device or unit, and may be electrical, or otherwise.

Separated units as illustrated may or may not be physically separated. Components displayed as units may or may not be physical units, and may reside at one location or may be distributed to multiple networked units. Some or all of the units may be selectively adopted according to practical needs to achieve desired objectives of implementations of the disclosure.

In addition, the functional units in various implementations of the disclosure may be integrated into one processing unit, or each unit may exit physically alone, or two or more units may be integrated into one unit. The above-mentioned integrated unit can be implemented in the form of hardware or a software function unit.

The integrated unit may be stored in a computer readable memory when it is implemented in the form of a software functional unit and is sold or used as a separate product. Based on such understanding, the technical solutions of the disclosure essentially, or the part of the technical solutions that contributes to the related art, or all or part of the technical solutions, may be embodied in the form of a software product which is stored in a memory and includes instructions for causing a computer device (which may be a personal computer, a server, or a TRP and the like) to perform all or part of the steps or operations described in the various implementations of the disclosure. The memory includes various medium capable of storing program codes, such as a universal serial bus (USB) flash disk, a read-only memory (ROM), a random access memory (RAM), a removable hard disk, disk, compact disc (CD), or the like.

It will be understood by those of ordinary skill in the art that all or part of the steps or operations of the various methods in implementations described above may be accomplished by means of a program to instruct associated hardware, the program may be stored in a computer readable storage, which may include a flash memory, a ROM, a RAM, disk or CD, and so on.

Implementations of the disclosure are described in detail above. Some examples are used herein to illustrate the principle and implementation manners of the disclosure. The description of the above implementations is only used to help understand the method and core idea of the disclosure. Meanwhile, for those of ordinary skill in the art, according to the idea of the disclosure, there will be changes in the implementation manner and the application scope. In summary, contents of this specification should not be construed as a limitation on the disclosure.

What is claimed is:

1. A method for determining a transmission reception point (TRP), applied to a network device and comprising:

receiving a first message from a terminal device, the first message indicating that beam failure occurs in the terminal device and/or indicating information of a candidate beam, the terminal device being configured to communicate with N TRPs, and N being a positive integer greater than 1; and determining a first TRP based on the first message, the first TRP being a TRP in which the beam failure occurs among the N TRPs, wherein the first message is a physical random access channel (PRACH), and a time-frequency resource for the PRACH is a first RACH occasion (RO) resource; and wherein when one synchronization signal/physical broadcast channel block (SS/PBCH block, SSB) or one channel state information-reference signal (CSI-RS) resource maps to M RO resources, the M RO resources comprise the first RO resource, M is a positive integer greater than 1, and the determining the first TRP based on the first message comprises:

dividing the M RO resources into N groups of RO resources; and determining the first TRP corresponding to the first RO resource based on a first mapping relationship between the N groups of RO resources and the N TRPs.

2. The method of claim 1, wherein dividing the M RO resources into the N groups of RO resources comprises:

obtaining the N groups of RO resources by classifying adjacent M/N RO resources among the M RO resources into one group of RO resources.

3. The method of claim 1, wherein dividing the M RO resources into the N groups of RO resources comprises:

obtaining the N groups of RO resources by classifying M/N RO resources separated by N−1 among the M RO resources into one group of RO resources.

4. A network device, comprising:

a transceiver;

a memory storing computer programs; and a processor coupled with the memory and the transceiver and configured to invoke the computer programs to:

cause the transceiver to receive a first message from a terminal device, the first message indicating that beam failure occurs in the terminal device and/or indicating information of a candidate beam, the terminal device being configured to communicate with N transmission reception points (TRPs), and N being a positive integer greater than 1; and determine a first TRP based on the first message, the first TRP being a TRP in which the beam failure occurs among the N TRPs, wherein the first message is a physical random access channel (PRACH), and a time-frequency resource for the PRACH is a first RACH occasion (RO) resource; and wherein when one synchronization signal/physical broadcast channel block (SS/PBCH block, SSB) or one channel state information-reference signal (CSI-RS) resource maps to M RO resources, the M RO resources comprise the first RO resource, M is a positive integer greater than 1, and the processor configured to invoke the computer programs to determine the first TRP based on the first message is configured to invoke the computer programs to:

divide the M RO resources into N groups of RO resources; and determine the first TRP corresponding to the first RO resource based on a first mapping relationship between the N groups of RO resources and the N TRPs.

5. The network device of claim 4, wherein the processor configured to invoke the computer programs to divide the M RO resources into the N groups of RO resources is configured to invoke the computer programs to:

obtain the N groups of RO resources by classifying adjacent M/N RO resources among the M RO resources into one group of RO resources.

6. The network device of claim 4, wherein the processor configured to invoke the computer programs to divide the M RO resources into the N groups of RO resources is configured to invoke the computer programs to:

obtain the N groups of RO resources by classifying M/N RO resources separated by N−1 among the M RO resources into one group of RO resources.

7. A non-transitory computer-readable storage medium storing a computer program, which causes a network device to:

receive a first message from a terminal device, the first message indicating that beam failure occurs in the terminal device and/or indicating information of a candidate beam, the terminal device being configured to communicate with N transmission reception points (TRPs), and N being a positive integer greater than 1; and determine a first TRP based on the first message, the first TRP being a TRP in which the beam failure occurs among the N TRPs, wherein the first message is a physical random access channel (PRACH), and a time-frequency resource for the PRACH is a first RACH occasion (RO) resource; and wherein when one synchronization signal/physical broadcast channel block (SS/PBCH block, SSB) or one channel state information-reference signal (CSI-RS) resource maps to M RO resources, the M RO resources comprise the first RO resource, M is a positive integer greater than 1, and the computer program causing the network device to determine the first TRP based on the first message causes the network device to:

divide the M RO resources into N groups of RO resources; and determine the first TRP corresponding to the first RO resource based on a first mapping relationship between the N groups of RO resources and the N TRPs.

8. The non-transitory computer-readable storage medium of claim 7, wherein the computer program causing the network device to divide the M RO resources into the N groups of RO resources causes the network device to:

obtain the N groups of RO resources by classifying adjacent M/N RO resources among the M RO resources into one group of RO resources.

9. The non-transitory computer-readable storage medium of claim 7, wherein the computer program causing the network device to divide the M RO resources into the N groups of RO resources causes the network device to:

obtain the N groups of RO resources by classifying M/N RO resources separated by N-1 among the M RO resources into one group of RO resources.

\* \* \* \* \*